April 18, 1961  A. D. FOSTER  2,980,212
SELF-UNLOADING CHECKOUT COUNTER
Filed Oct. 14, 1959  4 Sheets-Sheet 1
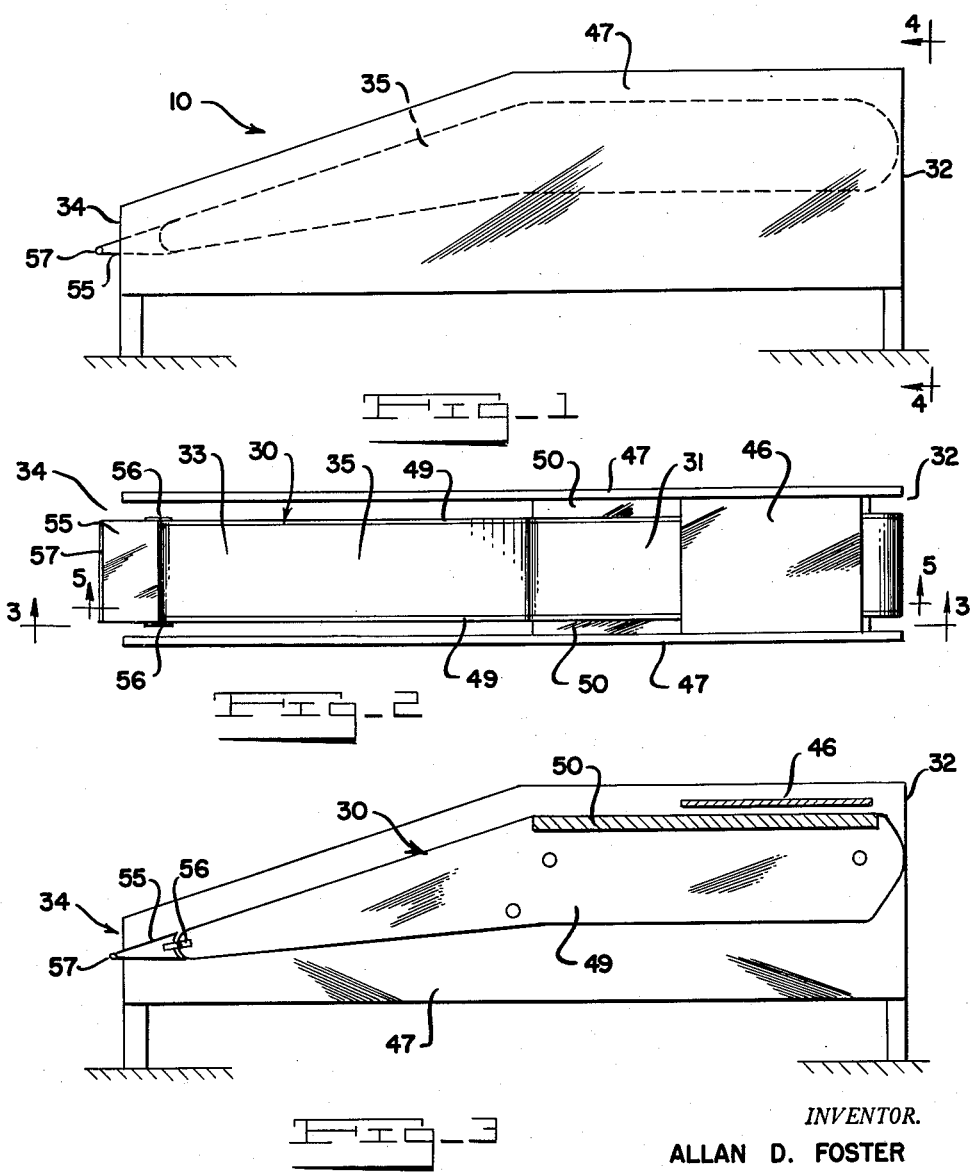
INVENTOR.
ALLAN D. FOSTER
BY Cullen & Cantor
ATTORNEYS April 18, 1961  A. D. FOSTER  2,980,212
SELF-UNLOADING CHECKOUT COUNTER Filed Oct. 14, 1959  4 Sheets-Sheet 2

INVENTOR.
ALLAN D. FOSTER
BY Cullen & Cantor
ATTORNEYS

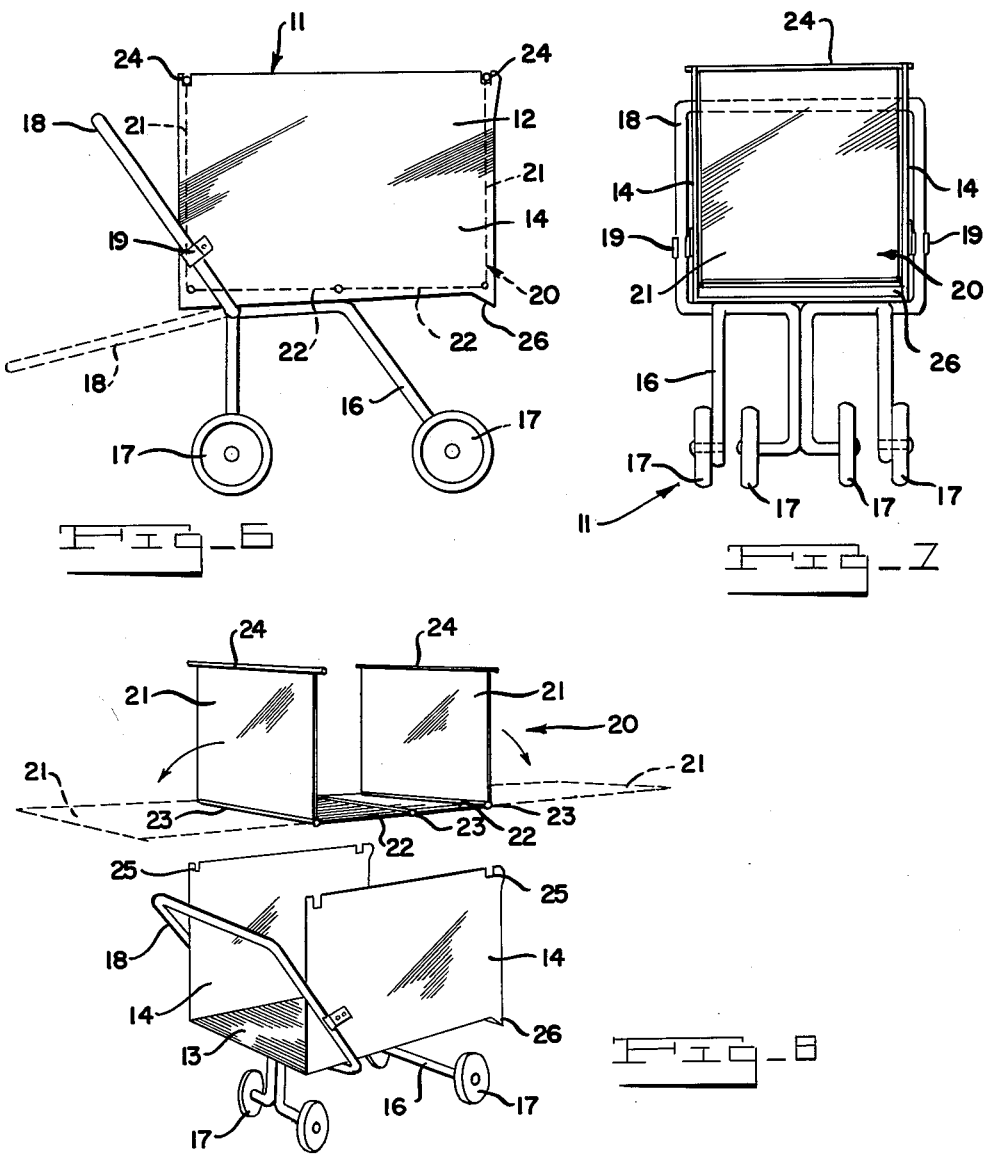

April 18, 1961     A. D. FOSTER     2,980,212
SELF-UNLOADING CHECKOUT COUNTER
Filed Oct. 14, 1959     4 Sheets-Sheet 4
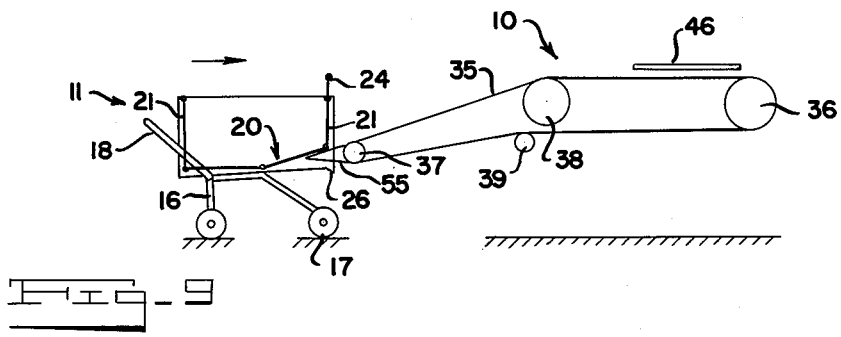
FIG-9
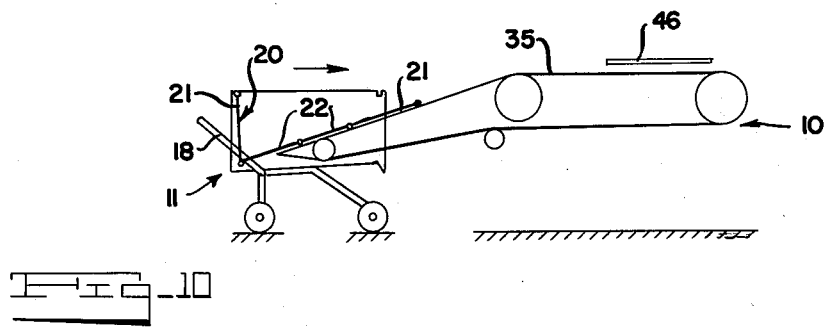
FIG-10
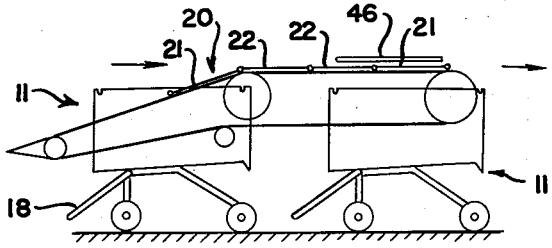
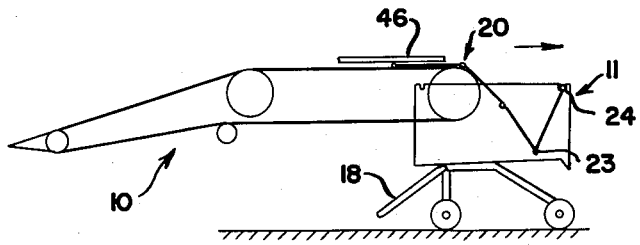
FIG-12
*INVENTOR.*
ALLAN D. FOSTER
BY
Cullen & Cantor
ATTORNEYS

United States Patent Office

2,980,212
Patented Apr. 18, 1961

2,980,212

SELF-UNLOADING CHECKOUT COUNTER

Allan D. Foster, Grosse Pointe, Mich., assignor to Almor Corporation, Detroit, Mich.

Filed Oct. 14, 1959, Ser. No. 846,399

6 Claims. (Cl. 186—1)

This invention relates to a self-unloading checkout counter and particularly for a counter suitable for use in supermarkets and the like for checking out groceries and for unloading the merchandise from shopping carts.

In the supermarket industry, it is common for the shopper to select her own merchandise, place it into a wheeled shopping cart, and bring the cart to the checkout counter. There the merchandise is checked, the customer pays her bill, and the merchandise is placed into bags for the customer to remove from the store. With each of these counters now in use, some person must manually remove the merchandise or groceries from the shopping cart and place them on the counter. That person may be the shopper or the check-out girl or an attendant.

The object of this invention is to eliminate the need for manually unloading the shopping cart and instead provide a checkout counter which unloads the cart itself and automatically conveys the merchandise to the check-out girl.

A further object of this invention is to form a shopping cart used in combination with the self-unloading checkout counter herein, which cart is formed with a removable pallet which supports the merchandise in the cart, forms the bottom and the end walls of the cart, and is automatically lifted out of the cart by the checkout counter to then serve as a means for carrying the merchandise to the checker, thus reducing wear on the counter conveyor, distributing the load of the merchandise upon the counter, and permitting unloading of the merchandise from the cart automatically rather than manually.

A further object of this invention is to form a checkout counter wherein the cart, once unloaded, may be slid underneath the checkout counter, from one end to the other, where it can be removed, and wherein the amount of space required for the storage of carts and for the movement of carts from one end of the counter to the other is substantially reduced. This is particularly important in supermarket operations where floor space is at a premium.

Still a further object of this invention is to form a combination cart and checkout counter which together remove the merchandise from the cart automatically, carry the merchandise to the checker, and remove the merchandise once it is placed into bags.

These and other objects and advantages of this invention will become apparent upon reading the following description of which the attached drawings form a part.

In these drawings:

Fig. 1 is a side elevation view of the checkout counter.

Fig. 2 is a top plan view of a counter, and

Fig. 3 is a cross-sectional elevation view taken in the direction of arrows 3—3 of Fig. 2.

Fig. 6 is an elevational view of the shopping cart, per se, and

Fig. 7 is an end view taken in the direction of arrow 7 of Fig. 6.

Fig. 8 is a perspective view of the shopping cart with its pallet removed and above it.

Figs. 9, 10, 11 and 12 schematically show successive steps in the unloading of a cart and movement of the pallet out of the cart and then back into the cart.

The shopping cart

Figure 4:
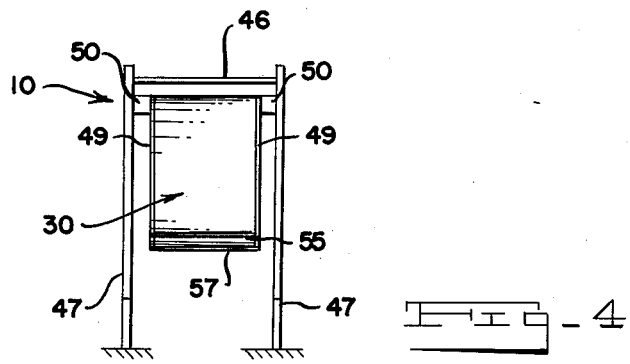
Fig. 4 is an end view taken in the direction of arrows 4—4 of Fig. 1.
Figure 5:
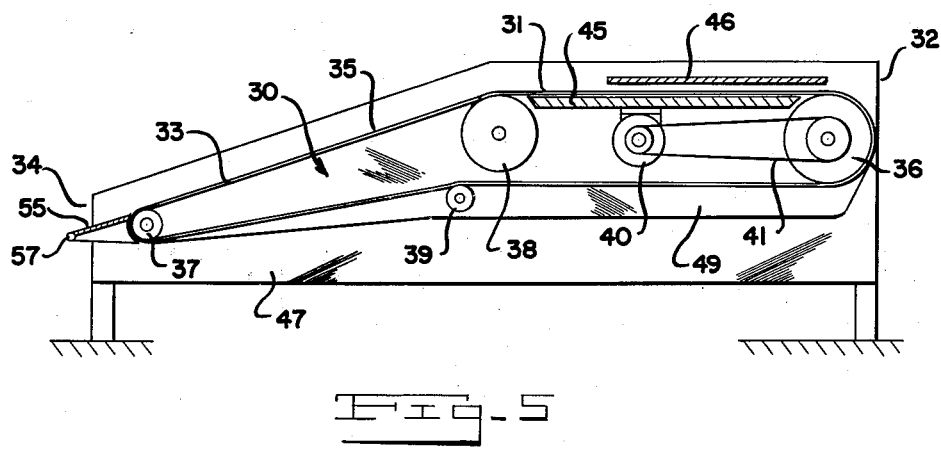
Fig. 5 is a sectional view taken in the direction of arrows 5—5 of Fig. 2.

The checkout counter 10 is used in conjunction with a shopping cart 11. With reference to Figs. 6, 7, and 8, the cart is formed of a U-shaped body 12 which consists of a bottom 13 and two side walls 14 and is open ended. The body is secured to a framework 16 having wheels 17 and a pivotally mounted pushing handle 18 wherein the body may be wheeled around for shopping purposes. The body is formed of a rigid material such as thin, rigid metal or plastic so that the U-shaped body remains substantially rigid despite not having end walls. The handle may pivot downwardly to be moved clear of the top part of the cart (see dotted lines in Fig. 5). It is held in its upper (solid line position) by means of a suitable releasible latch 19, such as a springy U-shaped receptacle.

A pallet 20 is provided in the form of flat, rigid, thin, sections which are hinged together. The two end sections 21 form the end walls of the body and the two center sections 22 form an inner bottom for the body. All of the sections are connected together by suitable hinges 23 and the upper ends of the end sections 21 are provided with cross pins 24 which extend beyond the width of the pallet.

The side walls 14 of the body are notched at 25 for the reception of the pins 24 so that the end sections 21 are suspended vertically due to their pins resting within notches 25, and the sections 22 remain more or less horizontal and spaced a short distance above the bottom of the body particularly at the front end of the basket where the body is sloped downwardly at 26 to form a space between the body bottom 13 and the section 22.

In use, the shopper takes the cart and wheels it about the floor and selects the merchandise that she desires and places it into the cart. Once she has completed her shopping, she wheels the cart to the checkout counter where the checker is waiting.

Checkout counter construction

With reference to Figs. 1–5, the checkout counter construction will now be described. The counter is formed of a merchandise handling unit 30 which consists of a flat, substantially horizontal merchandise receiving portion or deck 31 located at the exit end 32 of the counter and a merchandise loading or conveying portion 33 located at the entrance or receiving end 34 of the counter. These portions are made up of an endless conveyor belt 35, which is supported by pulley 36 at the exit end, pulley 37 at the entrance end, and intermediate pulley 38. A lower pulley 39 pushes the lower lap of the belt upwards and the upper lap of the belt forms the merchandise carrying part of the unit.

One of the pulleys 36 and 38 may be power driven by means of a motor 40 connected to the respective pulleys by means of a belt 41 to thus drive the pulleys and cause the conveyor belt to travel in a direction wherein its upper lap moves from the entrance end 34 towards the exit end 32 of the counter. The horizontal portion 31 is made up of the portion of the upper belt which is extended between the sloping portion and the exit end of the pulley and is preferably supported by a plate 45. Above the plate and the belt, a bagging plate 46 may be located and may be supported by and between the two side panels or legs 47 which make up the outside of the counter.

The unit 30 is held together by means of side plates 49, which may be formed of rigid metal plates or a suitable metal framework to rigidify and hold the entire unit as a completely integral, one-piece unit.

The merchandise handling unit is supported by the legs 47, which may be in the form of walls or separate legs or the like, and is connected to these legs 47 by means of suitable brackets 50 which are connected at one end to the plates 49 and at their opposite ends to the legs 47. Thus, the legs are joined to the merchandise handling unit only at the substantially horizontal merchandise receiving portion of the unit and are connected only near the top of the unit so that a substantial clearance is provided between both sides of the unit and their adjacent legs 47. The bottom of the unit is spaced above the floor so that a U-shaped passageway is provided, which extends the full length of the counter from one end to the other, and through which the cart may be rolled. The sloping belt portion 33 is supported only by the side plates 49 and is not connected to the supporting legs 47.

In addition, at the leading edge of the lower portion of the sloping belt, a guide plate 55 is arranged and is connected to the plate 49 by means of a suitable connecting bracket 56. The guide plate may be provided with a roller 57 so that the guide plate and roller extend the full width of the belt.

*Operation*

Figs. 9 to 12 show successive steps in the operation of the counter. As shown in Fig. 9, the shopper moves her loaded cart up to the receiving end of the checkout counter and continues moving it until the guide plate 55 slips into the space between the pallet section 22 and the sloping front end 26 of the cart body. When this happens, the front end section 21 is raised, so that its pins 24 rise above the notches 25 in the body sides, and then it falls forward onto the sloping conveyor belt portion. Further movement of the cart towards the counter plus the action of the moving belt pulls the pallet upwards upon the sloping belt (see Fig. 10) with its merchandise until finally the pallet reaches the horizontal section or deck portion (see Fig. 11). As the pallet rises and as it reaches the deck portion, the merchandise is conveyed to the checkout girl who stands opposite the flat deck portion of the belt and removes the merchandise from the pallet and places it upon the bagging plate 46. At the same time, she records the cost of the merchandise on a cash register (not shown) which would be next to her. The pallet continues moving until it is unloaded and reaches the end of the conveyor. Here, either the same cart or one of a number of stored carts is waiting, and the pallet is dropped back into the cart (see Fig. 12) where it resumes its normal position.

The merchandise may be placed into bags on top of the bagging plate or may be transferred to a bagging deck, such as an extension of the counter arranged at right angles to the counter (not shown).

Thus, the bagging boy or the person who does the bagging, places the merchandise into bags and then slips the bags into the cart to rest upon the pallet of the cart. At this point, the woman shopper having paid her bill then takes the cart and wheels it out of the store to the parking lot and to her car.

Hence, it can be seen that the cart coacts with the merchandise handling unit to carry the groceries to the merchandise handling unit, then the pallet is automatically removed and laid upon the belt and the pallet is moved on the belt with the merchandise that it carries to the checkout girl. Thereafter, the pallet is returned to the basket or cart body where it is then available for use in carrying away the merchandise which has been paid for and placed into bags.

This invention may be further developed within the scope of the following attached claims. Accordingly, it is desired that the foregoing description be read as being merely illustrative of an operative embodiment of this invention and not in a strictly limiting sense.

I now claim:

1. A supermarket checkout counter having an entrance end and an exit end, comprising a merchandise handling unit extending the length of the counter and consisting of a substantially horizontal merchandise receiving deck portion extending from the exit end towards and part way to the entrance end, and an unloading portion formed of an endless conveyor belt having a top belt lap that slopes upwards, relative to the horizontal, from the receiving end to said deck portion for carrying merchandise upwards from the receiving end to the deck portion; means supporting the unit with its bottom a considerable distance above floor level, said means consisting of legs connected at their upper ends to the sides of the unit near the top of the unit and at the deck portion of the unit, the legs supporting the unit upon a floor and the legs being spaced a short distance from the sides of the unit, the unloading portion being supported only by the receiving portion of the unit, and a U-shaped passageway consisting of the space beneath the unit and the side spaces between the respective sides of the unit and the support legs, extending the full length of the counter wherein a shopping cart having a U-shaped body supported on wheels may be moved into the entrance end of the counter through the passageway and out of the exit end of the counter.

2. A construction as defined in claim 1, and wherein said receiving deck portion is formed of an extension of the top belt lap of said conveyor belt, which belt is arranged to continue towards the exit end of the counter with the top belt lap of the extension being substantially horizontally arranged.

3. A supermarket checkout counter having an entrance end and an exit end, comprising a merchandise handling unit extending the length of the counter and consisting of a substantially horizontal merchandise receiving deck portion extending from the exit end towards and part way to the entrance end; means for conveying merchandise to the deck portion, said means comprising an endless conveyor belt having a top belt lap that slopes downwards, relative to the horizontal, from the deck portion to the entrance end of the counter, and a pallet for carrying merchandise and for being conveyed upon the belt to and upon the deck portion, said pallet being fitted into a shopping cart formed of a U-shaped body consisting of a base and two side walls, the pallet being formed of sections hinged together end to end, with two end sections being vertically arranged in the cart and being suspended from the tops of the cart sides to form the ends of the cart and a center section forming an inner bottom for the cart; the entrance end of the conveyor belt being formed to fit between the cart bottom and the pallet center section to lift the pallet out of the cart as the cart is advanced towards the belt and cause the pallet to lie flat on the belt to convey the merchandise carried by the pallet to the receiving deck.

4. A construction as defined in claim 3 and including means for supporting said unit on a floor with its bottom considerably above the floor level, the supporting means consisting of legs arranged at each side of the unit and spaced from the sides of the unit, the legs being connected to the sides of the unit, near the top of the unit, at the receiving deck portion only; a passageway formed throughout the length of the counter by the space beneath the unit and the spaces at the sides of the unit and being of a size to freely pass a shopping cart, after its pallet has been removed by the conveyor belt, through the passageway and out of the exit end of the counter.

5. A construction as defined in claim 4 and wherein the deck portion includes a portion of the top lap of the conveyor belt, with the conveyor belt being extended towards the exit end of the counter and with its extended top lap being arranged substantially horizontally.

6. A construction as defined in claim 5 and wherein said conveyor belt extension extends to the exit end of the counter and carries the pallet to a point where it drops off the exit end of the counter and back into the body of a shopping cart.

References Cited in the file of this patent
UNITED STATES PATENTS

| Number | Name | Date |
|---|---|---|
| 529,583 | Beatty | Nov. 20, 1894 |
| 800,061 | Blue | Sept. 19, 1905 |
| 2,583,514 | Maslow | Jan. 22, 1952 |
| 2,596,686 | Hess | May 13, 1952 |
| 2,604,190 | Meyer | July 22, 1952 |
| 2,639,161 | Goldman | May 19, 1953 |

FOREIGN PATENTS

| 80,921 | Austria | July 10, 1920 |